United States Patent [19]

Chattin

[11] 4,446,754
[45] May 8, 1984

[54] PEDAL TELESCOPING DEVICE

[76] Inventor: Jesse R. Chattin, 7201 S. 49th Ave., Tampa, Fla. 33600

[21] Appl. No.: 350,262

[22] Filed: Feb. 19, 1982

Related U.S. Application Data

[63] Continuation of Ser. No. 100,625, Dec. 5, 1979, abandoned, which is a continuation-in-part of Ser. No. 901,363, Apr. 28, 1978, abandoned.

[51] Int. Cl.³ .............................................. G05G 1/14
[52] U.S. Cl. .................................................. 74/594.3
[58] Field of Search ....................... 74/594.3, 601, 602

[56] References Cited

U.S. PATENT DOCUMENTS

| 516,137 | 3/1894 | Tyler | 74/594.3 |
|---|---|---|---|
| 550,206 | 11/1895 | Tompkins | 74/594.3 |
| 571,793 | 11/1896 | Rau | 74/594.3 |
| 623,863 | 4/1899 | Atterbury | 74/594.3 |
| 641,728 | 1/1900 | Robinson | 74/594.3 |
| 653,873 | 7/1900 | Malone | 74/594.3 |
| 676,629 | 6/1901 | Moore | 74/594.3 |
| 1,636,327 | 7/1927 | Roe | 474/144 |

FOREIGN PATENT DOCUMENTS 611342 10/1960 Italy .................................. 74/594.3

*Primary Examiner*—Kenneth Dorner
*Attorney, Agent, or Firm*—Frijouf, Rust & Pyle

[57] ABSTRACT

An apparatus for changing the leverage of a bicycle pedal by telescoping the pedal on the pedal arm during rotation of the pedal arm and pedal guide around the pedal axis; the apparatus comprising a pedal guide which includes a lead bolt and has the pedal attached thereto, a pedal arm, a cam plate, a cam ring, a ring bearing, a pedal axle, a sprocket, and a spindle housing. The lead bolt of the pedal guide rotatably attaches to the cam ring which peripherally encloses the ring bearing. The ring bearing is peripherally located around the cam plate thus enabling the cam ring to rotate with respect to the cam plate. As the pedal arm and pedal guide rotate, the cam ring and cam plate control the telescoping motion of the pedal and pedal guide by controlling the movement of the lead bolt of the pedal guide. The pedal guide slides on the pedal arm. The sprocket is fixedly connected to the pedal axle.

15 Claims, 9 Drawing Figures

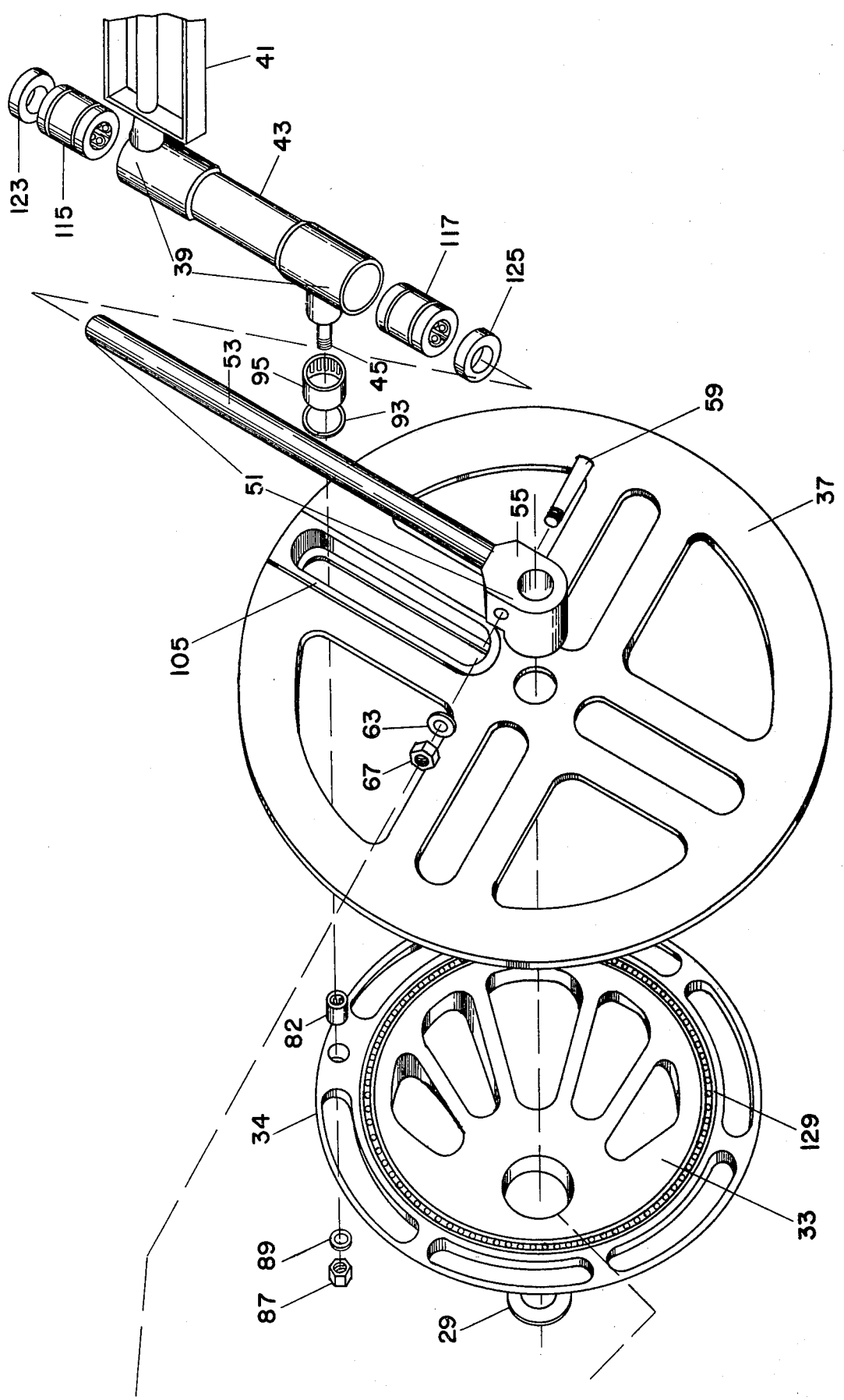
FIG. IC

PEDAL TELESCOPING DEVICE

This application is a continuation of application Ser. No. 100,625, filed Dec. 5, 1979, now abandoned which was a continuation-in-part of application Ser. No. 901,363, filed Apr. 28, 1978, now abandoned.

This invention relates to bicycles. More particularly, this invention is related to bicycle pedal assemblies.

This invention provides for an effective means of increasing the efficiency of a bicycle pedal assembly in changing human energy into a driving force on the bicycle's chain. This is accomplished by attaching the pedal to a pedal guide that telescopes on the pedal arm as the pedal arm rotates around the pedal axle. The motion of the pedal guide is controlled by a cam ring and a cam plate. The pedal guide is attached to the cam ring which rotates around the cam plate. This serves to change the leverage arm of the pedal with respect to the pedal axle as the arm rotates, so that the pedal's maximum leverage is attained when it will most efficiently translate the human energy into a driving force on the bicycle chain.

Numerous attempts have previously been made to increase the efficiency of a bicycle through the use of a telescoping pedal. Generally speaking, however, these attempts have not been as successful as desired primarily because of the many frictional problems contained therein. One of the major frictional problems that frustrated those responsible for the prior art attempts is the friction present between a cam element and an element that interfaces with the cam, i.e., the element that runs in the track of the cam. In addition, there is the problem of the friction caused by the linear sliding motion between the element of which the pedal is a part and the element that is connected to the end of the pedal axle and rotates with the axle, i.e., the pedal arm.

Exemplary of the above-described prior art are the following U.S. Pat. Nos.: 516,137; 550,206; 571,793; 623,863; 653,873; 676,629.

None of these prior art patents disclose apparatus able to adequately solve the above-described friction problems.

From the above, it is apparent that there exists a need in the art for an improved pedal telescoping apparatus thereby to increase the effectiveness of the pedalling operation of a bicycle. It is the purpose of this invention to fulfill this and other needs apparent to the skilled artisan once given the following disclosure:

Generally speaking, this invention fulfills the needs of the prior art by providing an apparatus for telescoping the pedal of a pedal assembly during the rotation of the pedal around a pedal assembly axle, the apparatus comprising a spindle housing; an axle shaft; said axle shaft being rotatably located within said spindle housing; a cam plate located on said axle shaft such that said cam plate is stationary with respect to said spindle housing; a cam ring circumferentially spaced from said cam plate; a pedal arm; a telescopable pedal guide having a lead bolt as one element; and a sprocket that is fixably attached to said pedal axle; said lead bolt being slidably located on the peripheral of said cam plate; wherein said cam plate and said cam ring control the movement of said lead bolt, thus, controlling the telescoping motion of said pedal guide as said pedal arm and said pedal guide rotate around said axle shaft.

This invention will now be described with reference to certain embodiments thereof as illustrated in the accompanying drawings, wherein:

IN THE DRAWINGS

FIGS. 1(a), 1(b) and 1(c) are a continuaton exploded view of one embodiment of this invention.

Figure 5A:
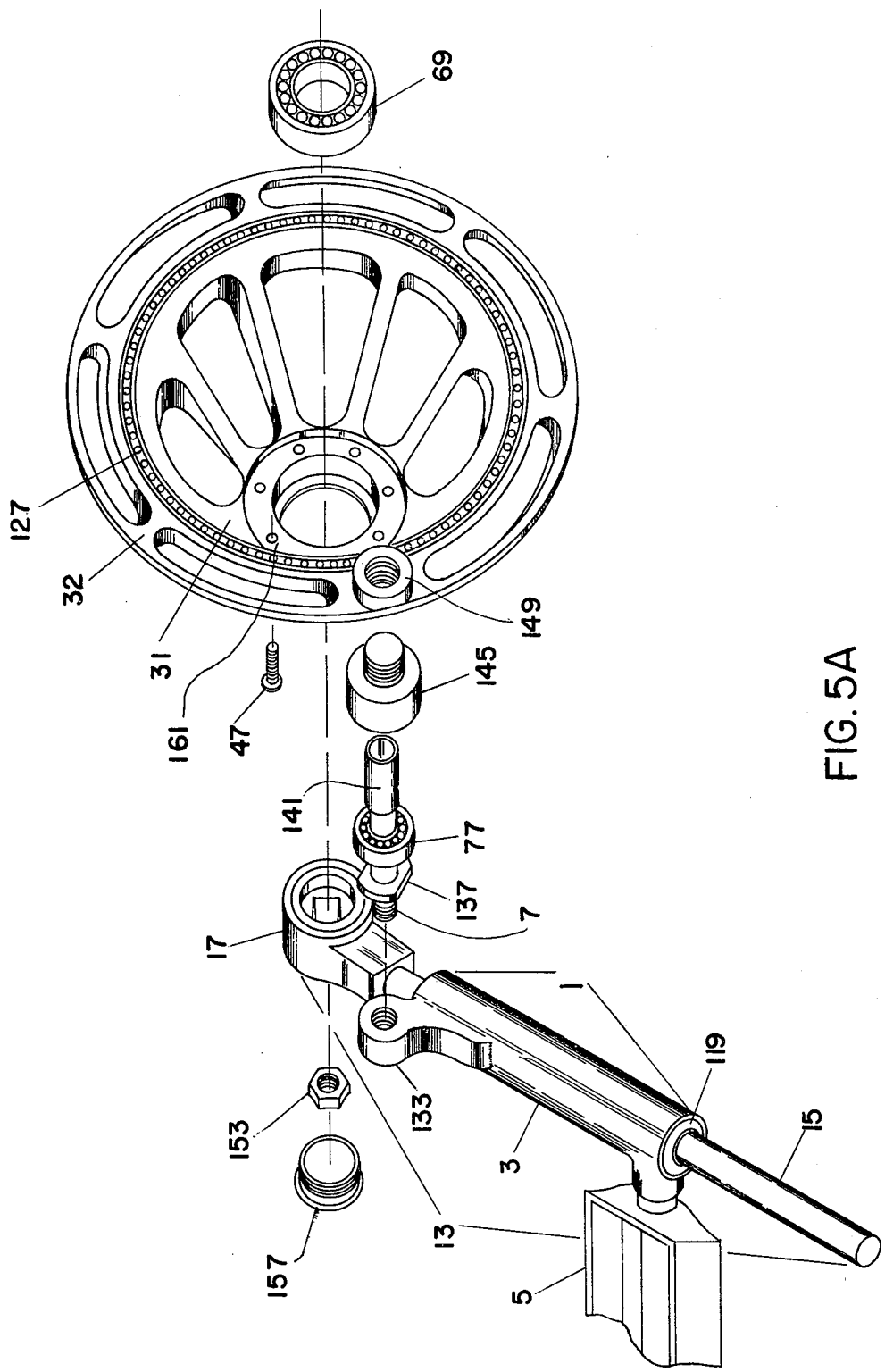
Figure 5B:
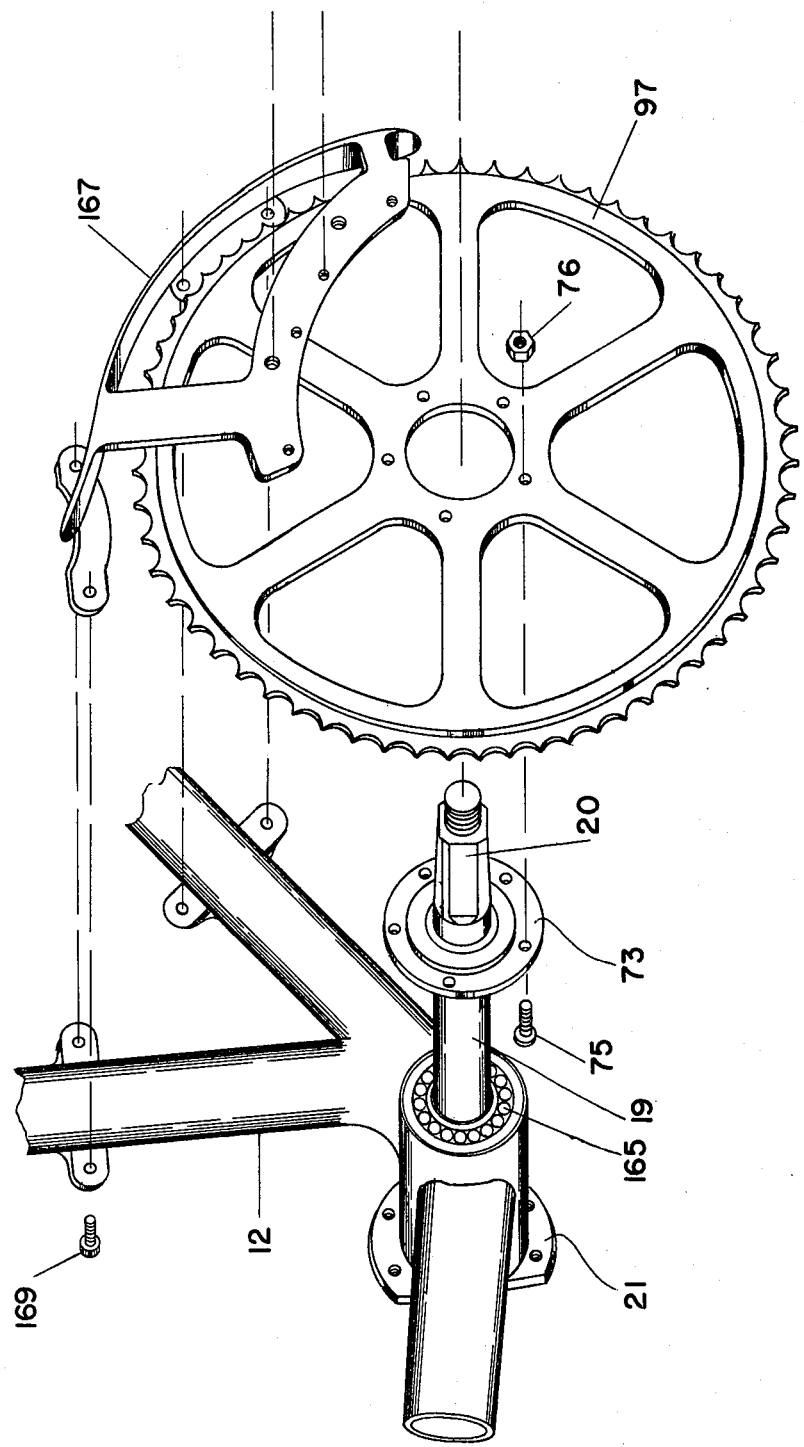
Figure 5C:
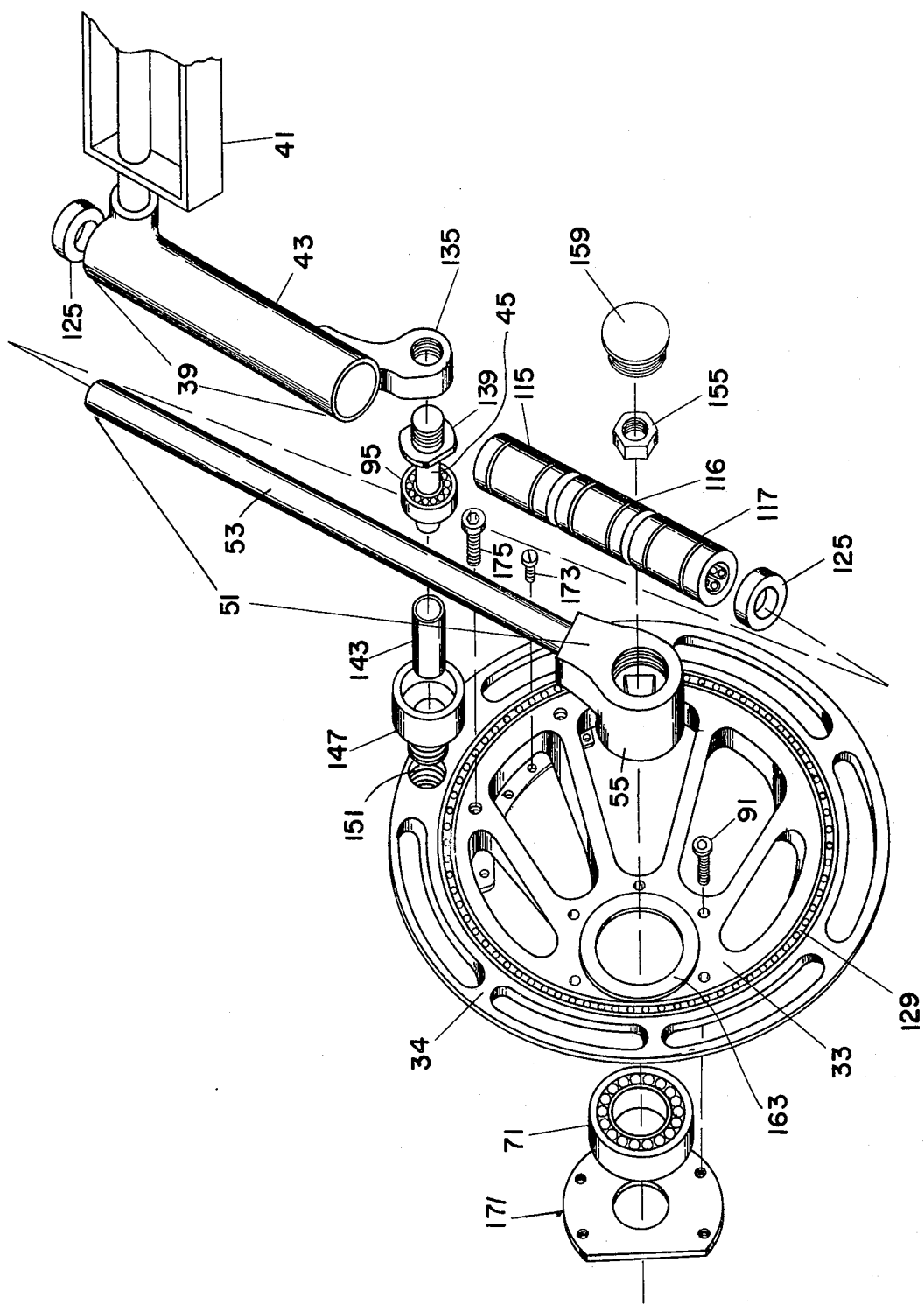

FIGS. 5(a), 5(b) and 5(c) are a continuation exploded view of a second embodiment of this invention.

Figure 2:
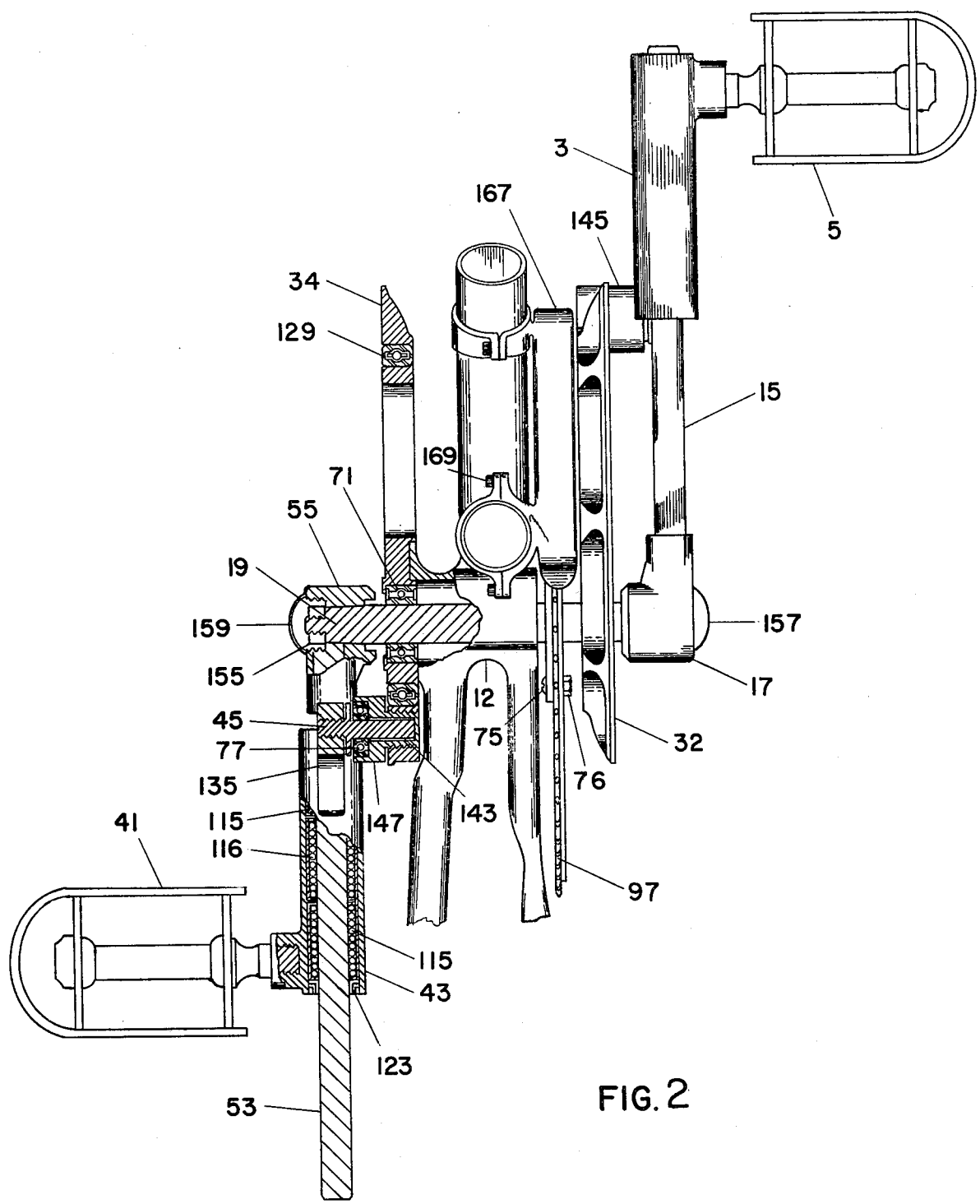
Figure 3:
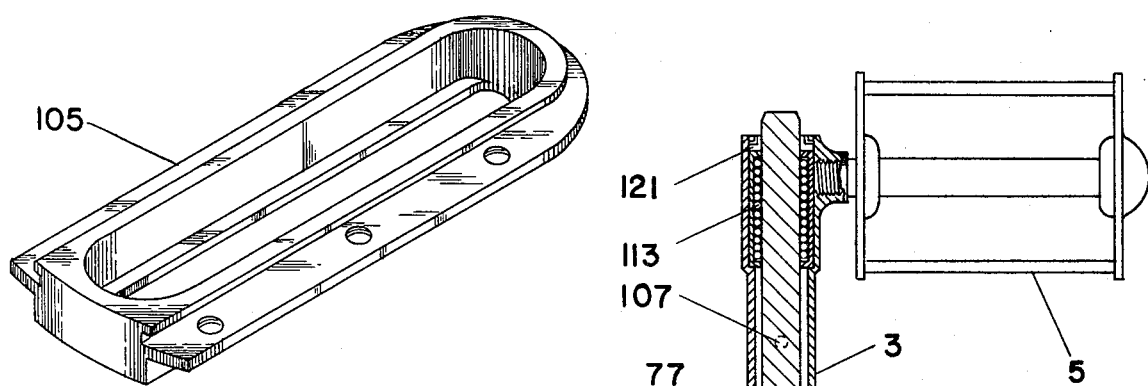
FIG. 3 is a perspective view of a guide bearing surface of the embodiment illustrated in FIG. 1.

FIG. 2 is a top plan view, partially sectionalized, of the embodiment illustrated in FIG. 5.

Figure 1A:
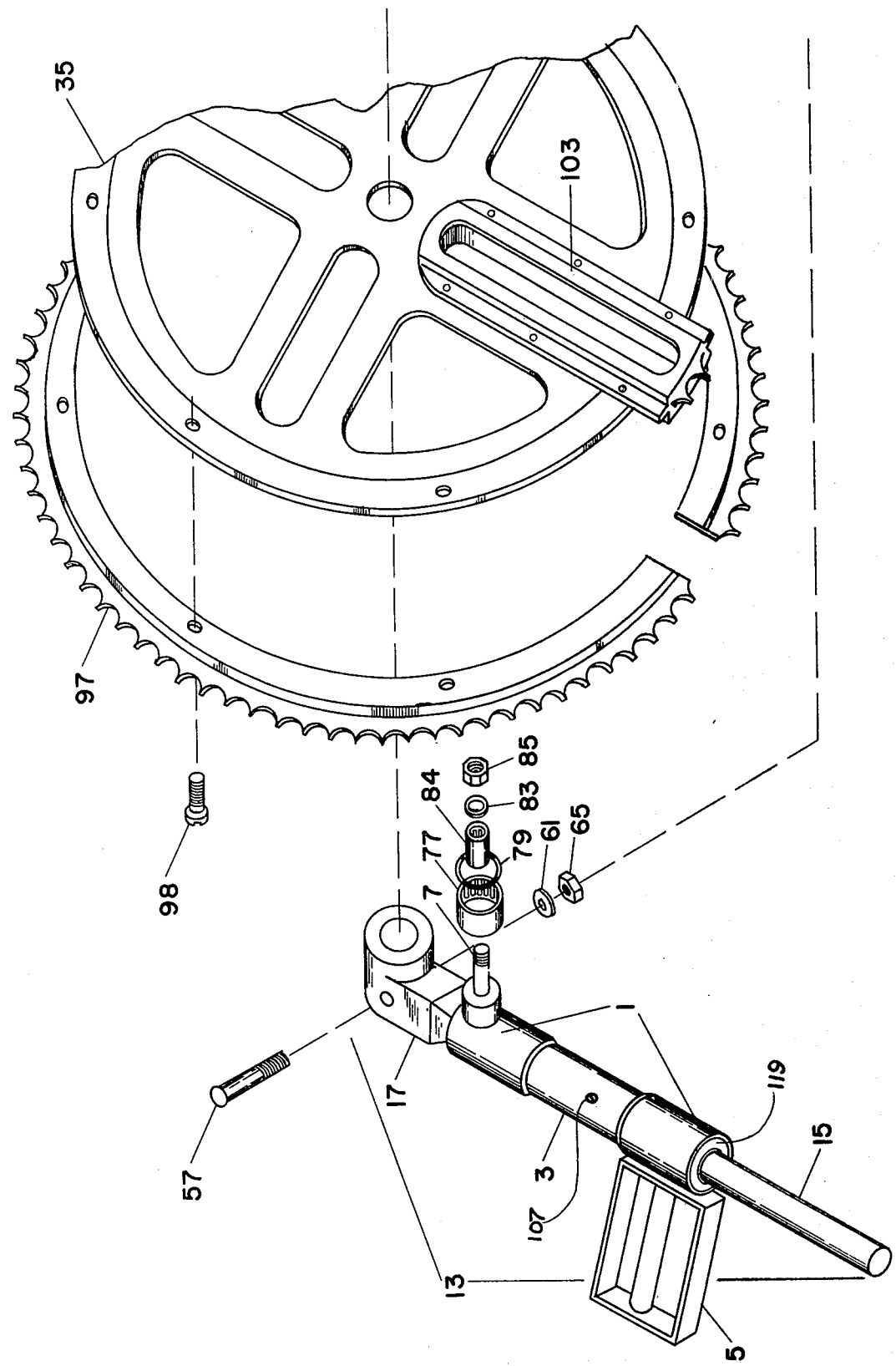
Figure 1B:
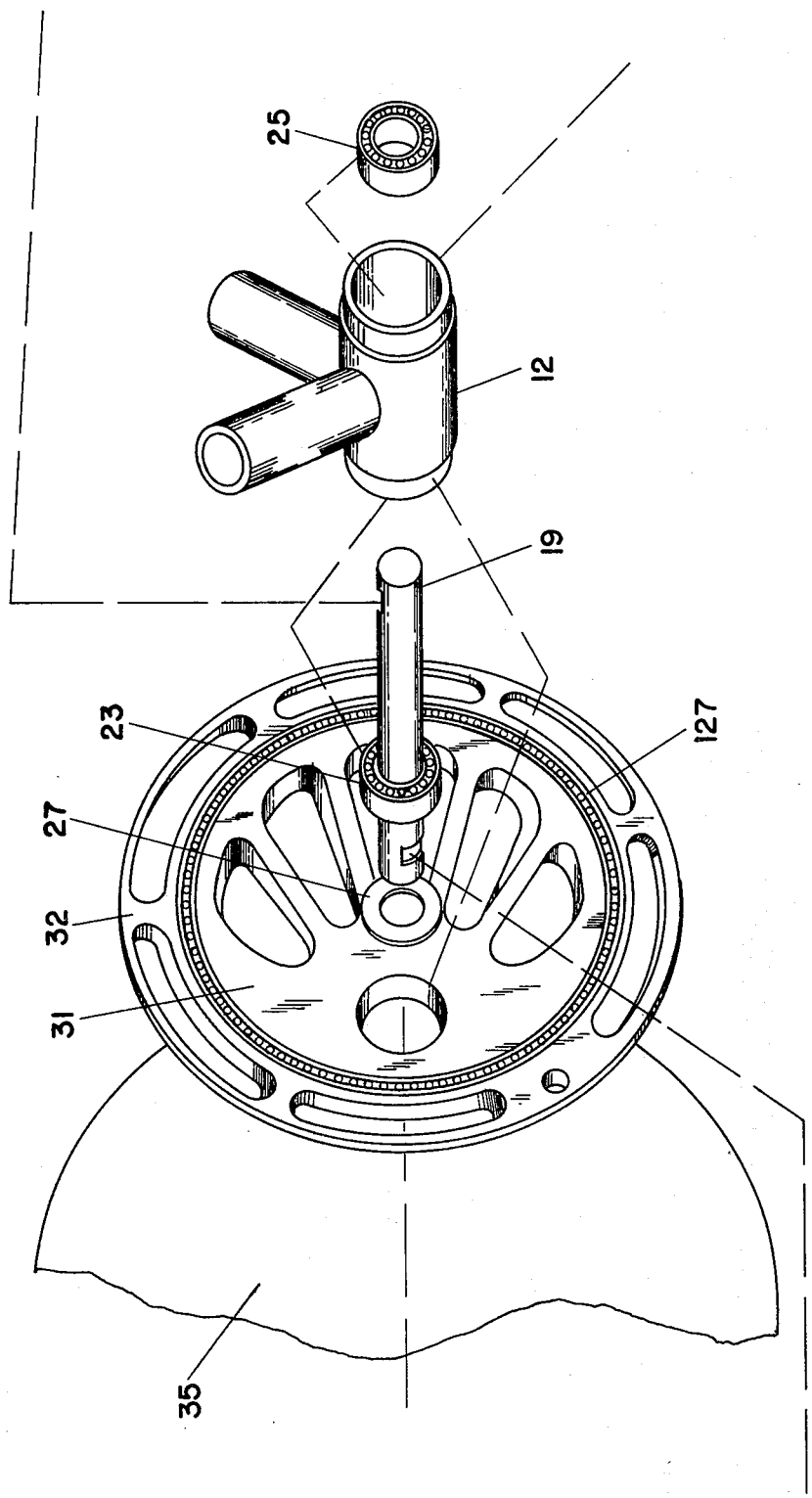

Referring to the accompanying drawings, the embodiment illustrated in FIG. 1 will be described first. Pedal guides 1 and 39 are comprised of hollow cylinders 3 and 43, pedals 5 and 41, and lead bolts 7 and 45, respectively. Pedals 5 and 41, are affixed on the opposite side and towards the opposite ends of hollow cylinders 3 and 43 from where lead bolts 7 and 45 are located. Hollow cylinders 3 and 43 have an interior diameter greater than the diameter of pedal arms 13 and 51, respectively. This enables pedal guides 1 and 39 to be easily slipped off pedal arms 13 and 51 after disconnecting lead bolts 7 and 45 from the rest of the bicycle assembly. Thus, the linear motion of pedal guides 1 and 39 along pedal arms 13 and 51 is not restricted by pedal arms 13 and 51, enabling pedal guides 1 and 39 to telescope on pedal arms 13 and 51 with respect to pedal axle 19.

Pedal arms 13 and 51 are comprised of rods 15 and 53 and axle end housings 17 and 55, respectively. Rods 15 and 53 are of a diameter such that the interior faces of hollow cylinders 3 and 43, respectively, can slide on them during the telescoping motion of pedal guides 1 and 39 on pedal arms 13 and 51, respectively.

Axle end housings 17 and 55 are located at one end of rods 15 and 53 and have holes therein to receive the ends of pedal axle 19 and bolts 57 and 59.

Ball bushings 111 and 113, 115 and 117, are placed on rods 15 and 53, respectively, one located under each end of pedal guides 1 and 39 to help minimize the friction of the relative linear sliding motion between pedal guides 1 and 39 and pedal arms 13 and 51. Oil seals 119 and 121, 123 and 125, are placed on the ends of ball bushings 111 and 113, 115 and 117, respectively, such that oil seals 119 and 121, 123 and 125 are on both ends of pedal guides 1 and 39, in order to keep lubricating oil between pedal guides 1 and 39 and pedal arms 13 and 51.

Holes are located in hollow cylinders 3 and 43 so that oil caps 107 and 109, respectively, may be inserted. This enables one to inject lubricating oil between hollow cylinders 3 and 43 and rods 15 and 53 to further minimize the friction between the hollow cylinders 3 and 43, rods 15 and 53, and ball bushings 111, 113, 115 and 117, as the linear sliding motion occurs between the same.

Axle shaft 19 has located thereon spindle housing 12, spindle bearings 23 and 25, spacers 27 and 29, and guide plates 35 and 37, respectively. The ends of axle shaft 19 are fastened into axle end housings 17 and 55 by bolts 57 and 59, washers 61 and 63, and nuts 65 and 67, respectively. Bolts 57 and 59 engage slots at each end of axle shaft 19 to lock axle shaft 19 in place. Spindle bearings 23 and 25 are placed on axle shaft 19 between spindle housing 12 and pedal axle 19, one at each end of spindle housing 12, to allow axle 19 to rotate with respect to spindle housing 12. Spacers 27 and 29 are located on pedal axle 19, one on each end of spindle housing 12, between spindle housing 12 and guide plates 35 and 37. This configuration of the elements enables axle shaft 19 to rotate in spindle housing 12 while spindle housing 12 remains stationary with reference to the non-rotating parts of the rest of the bicycle.

Guide plates 35 and 37 are flat circular plates having slots therein. Two of these slots are radial slots into which guide bearing surfaces 103 and 105, respectively, are fastened. Guide bearing surfaces 103 and 105 provide a surface on which guide bearings 77 and 95, respectively, roll. The other slots in guide plates 35 and 37 have the functions of making the apparatus lighter for greater energy efficiency, and of lessening the material costs.

Figure 4:
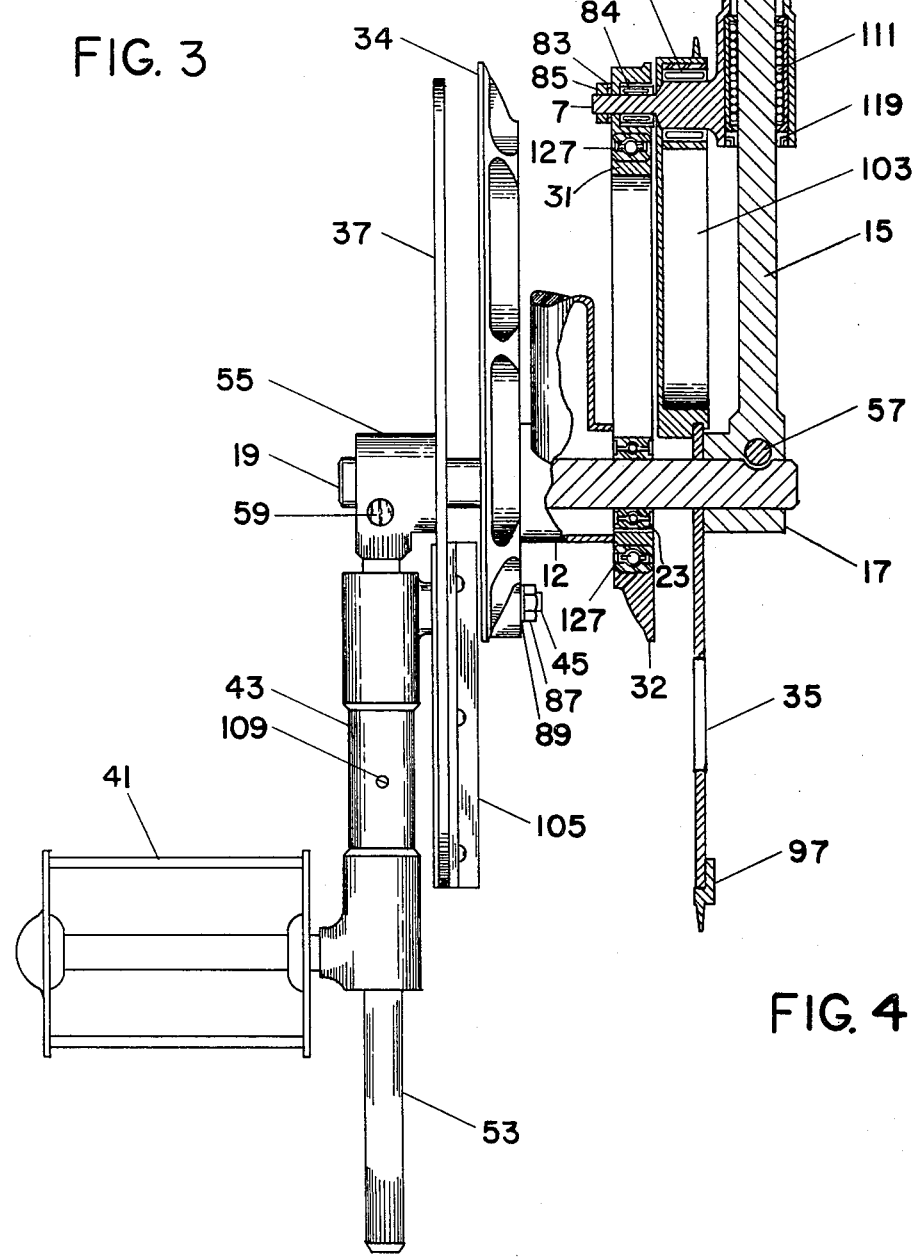
FIG. 4 is a plan view, partially sectionalized for clarity, of the embodiment illustrated in FIG. 1.

Lead bolts 7 and 45 retain thereon guide bearings 77 and 95, spacers 79 and 93, washers 83 and 89, cam bearings 82 and 84, washers 83 and 89, and nuts 85 and 87, respectively. Guide bearings 77 and 95 are located on lead bolts 7 and 45 and allow guide plates 35 and 37 to rotate with respect to lead bolts 7 and 95, respectively. Cam bearings 84 and 82 are located directly on lead bolts 7 and 45. As illustrated in FIG. 4, the apparatus is assembled such that guide bearings 77 and 95 interface with guide bearing surfaces 103 and 105, respectively, and such that cam bearings 84 and 82 are received in the appropriate holes in cam rings 32 and 34, respectively. Cam bearings 84 and 82 permit cam rings 32 and 34 to rotate with respect to lead bolts 7 and 45. Guide bearing surfaces 103 and 105 have an edge extending inward to retain guide bearings 77 and 95 thereunder.

Cam plates 31 and 33 are flat plates that are placed on spindle housing 12, having slots therein to minimize their weight and holes therein to receive axle shaft 19. One of cam plates 31 and 33 is located at each end of spindle housing 12. Cam plates 31 and 33 have peripherally located thereon ring bearings 127 and 129 and cam rings 32 and 34, respectively. Ring bearings 127 and 129 are located between cam plates 31 and 33 and cam rings 32 and 34. The use of ring bearings 127 and 129 allow cam plates 31 and 33 to remain stationary with respect to spindle housing 12 while cam rings 32 and 34 rotate with lead bolts 7 and 45, respectively. Cam rings 32 and 34 rotate because they engage lead bolts 7 and 45 which rotate when pedal arms 13 and 51 are rotated as the bicycle is being ridden.

Chain sprocket or drive means is fixedly attached to (in this embodiment by screws 98) one of guide plates 35 or 37 (in this embodiment guide plate 35) in order to translate the circular motion of guide plates 35 and 37 into a driving force on the bicycle chain. Chain sprocket 97 has a gap therein to receive guide bearing surface 103 which also has means to engage and drive the bicycle chain.

One way to simplify this invention would be to remove ball bushings 111, 113, 115, and 117, oil seals 119, 121, 123, and 125, and oil caps 107 and 109. If these items were removed, cylinders 3 and 43 could be of one constant dimension instead of having two dimensions as illustrated in FIG. 1, and the interior surfaces of cylinders 3 and 43 would directly interface the exterior surfaces of pedal arms 15 and 53. However, the frictional problems would increase and more energy would be needed to operate the apparatus.

A second embodiment of this invention is illustrated by FIGS. 5(a), 5(b), 5(c) and 2. This embodiment is similar to the first embodiment with the following differences.

Lead bolts 7 and 45 are removably attached to pedal guides 1 and 39 instead of being fixably attached thereto. One end of lead bolts 7 and 45 is threaded to screw into guide rod holders 133 and 135, which are a part of pedal guides 1 and 39, respectively. Guide rod holders 133 and 135 are located at a right angle with pedals 5 and 41 near the opposite ends of pedal guides 1 and 39 from pedals 5 and 41. Lead bolts 7 and 45 have as an element thereof washers 137 and 139, respectively, which, when the apparatus is assembled, are located between guide rod holders 133 and 135 and guide bearings 77 and 95. Ball bushings 141 and 143 are also located on lead bolts 7 and 45, respectively, and have the function of ensuring that lead bolts 7 and 45 easily rotate with respect to guide rod plugs 145 and 147, respectively. Guide rod plugs 145 and 147 radially surround guide bearings 77 and 95 and ball bushings 141 and 143 and, screw into nuts 149 and 151, which are a part of cam rings 32 and 34, respectively.

To summarize the discussion of these elements, lead bolts 7 and 45 remain stationary with respect to and rotate with pedal guides 1 and 39 and guide rod plugs 145 and 147 remain stationary with respect to and rotate with cam rings 32 and 34. These rotational movements result, in effect, in guide rod plugs 145 and 147 rotating with respect to lead bolts 7 and 45. Guide bearings 77 and 95 and ball bushings 141 and 143 minimize the friction during this rotation between lead bolts 7 and 45 and guide rod plugs 145 and 147.

In this second embodiment, hollow cylinders 3 and 45 have a constant diameter instead of having two diameters as in the first embodiment. This makes it possible to place three ball bushings in between pedal guides 1 and 39 and pedal arms 13 and 51. Ball bushings 114 and 116 are placed on rods 15 and 53, respectively, in between ball bushings 111 and 113, 115 and 117, thus further reducing the friction between pedal guides 1 and 39 and pedal arms 13 and 51 as the apparatus operates.

Axle end housings 17 and 55 and pedal axle 19 are of a slightly different shape in this embodiment. Axle end housings 17 and 55 have an interior wall with a hole therethrough to receive pedal axle 19. Pedal axle 19 is threaded on both ends so that nuts 153 and 155, respectively, can be placed thereon to fasten pedal axle 19 to pedal arms 13 and 51. Axle plugs 157 and 159 are then screwed into the outside of axle end housings 17 and 55, respectively, to protect the assembly from dirt, water, grime, etc.

The need for guide plates 35 and 37 and guide bearing surfaces 103 and 105 has been eliminated in this second embodiment. However, cam bearing surfaces 161 and 163 have been added. Cam bearing surfaces 161 and 163 are located in cam plates 31 and 33, respectively, and peripherally encompass cam plate ball bushings 69 and 71, respectively. Cam plate ball bushings 69 and 71 are located on axle shaft 19. Thus, cam plates 31 and 33 remain stationary with respect to other non-rotating elements of the apparatus as pedal axle 19 rotates. Cam bearing surfaces 161 and 163 have an outer edge that protrudes into the hole in which cam plate ball bushings 69 and 71 are received to retain cam ball bushings 69 and 71 in place. Furthermore, cam bearing surfaces 161 and 163 have holes therein of sufficient size such that the threaded ends of screws 47 and 91, respectively, can pass through, but such that the heads of screws 47 and 91 cannot pass through. Cam plate ball bushings 69 and 71 are retained in their appropriate places, when the apparatus is assembled, by axle plate 21 and spindle plate 171. Spindle plate 171 is attached to cam bearing surface 163 by screws 91.

Spindle ball bushing 165 is located on pedal axle 19 under spindle housing 12 and is held in place laterally by axle plates 21 and 73. Chain sprocket 97 in this embodiment is a complete plate, unlike the other embodiment, with slots therein to minimize the weight, holes therein to receive screws 75, and a hole in the center to receive pedal axle 19. Chain sprocket 97 is bolted to axle plate 73, which is located on axle shaft 19, by bolts 75 and nuts 76. Pedal axle 19 has also located thereon spacer 20 which separates chain sprocket 97 from axle end housing 55 by the proper distance.

Chain guard 167 is fastened to spindle housing 12 by screws 169 and has the function of preventing a rider's clothing, etc., from getting tangled up in the chain. Chain guard 167 is also attached to cam plate 33 by screws 173 and 175. Cam plate ball bushing 71 is held in the proper hole in cam plate 31 by axle plate 171 which is attached to cam plate 31 by screws 91.

All other elements of the first embodiment remain unchanged in the second embodiment.

OPERATION

Since the devices in which the disclosed apparatus maybe used are conventional, the devices are not shown. It is understood, however, that the subject apparatus can be used on all bicycles and other devices which use pedal power to rotate a chain sprocket and drive a chain attached thereto. The chain sprocket illustrated is, thus, generic to these types of devices, conventional bicycles being one preferred environment for this invention. If the disclosed apparatus is to be installed on an existing bicycle or other such device, some modification of the bicycle frame or other framework may be necessary in order to make the illustration.

The operation of the apparatus is best illustrated by reference to a conventional bicycle. The basic operation of the two embodiments described above is the same and is as follows. As one riding a bicycle with this apparatus installed therein pedals the bicycle, pedal guides 1 and 39 and pedal arms 13 and 51 rotate around pedal axle 19. Lead bolts 7 and 45, which are elements of pedal guides 1 and 39, likewise rotate around pedal axle 19. Lead bolts 7 and 45 are attached to cam rings 32 and 34, which, therefore, causes cam rings 32 and 34 to rotate around cam plates 31 and 33 which are stationary with respect to the other non-rotating elements on the bicycle. As cam rings 32 and 34 so rotate, the distance between lead bolts 7 and 45 and the central axis of pedal axle 19 (and also the distance between pedals 5 and 41 and pedal axle 19) varies due to the fact that cam plates 31 and 33 control the movement of lead bolts 7 and 45.

In other words as the pedals 5 and 41 rotate forward in the direction of travel of the bicycle during the input or power stroke (extension), the arc of travel is significantly greater than the arc of travel during the rotation in the opposite or rearward direction (retraction). Since the pedals 5 and 41 are attached to the pedal exle 19, the cam rings 32 and 34 must travel faster in the forward direction than in the rearward direction. Thus, the speed of the cam rings 32 and 34 varies during rotation.

Therefore, pedal arms 13 and 51 are moving in a true circle with pedal axle 19 as the center of this circle while pedal guides 1 and 39, pedals 5 and 41, and lead bolts 7 and 45 are moving in an elliptical motion around pedal axle 19 because the motion of lead bolts 7 and 45 is controlled by cam plates 31 and 33. This creates a linear movement between pedal arms 13 and 51 and pedal guides 1 and 39, of which lead bolts 7 and 45 are elements, which results in the telescoping movement of pedals 5 and 41. As previously stated, the basic mmechanics of the operation of the various embodiments of this invention are the same. However, the specific interacting elements vary between the embodiments and operate differently. The specific operation of each embodiment will now be discussed.

In the first embodiment, guide plates 35 and 37 are centrally located on pedal axle 19 and receive lead bolts 7 and 45 thru a slot therein. This slot is further defined by guide bearing surfaces 103 and 105, which are attached to guide plates 35 and 37 and interface with guide bearings 77 and 95, guide bearings 77 and 95 being located on lead bolts 7 and 45. When pedal guides 3 and 43 and pedal arms 13 and 51 rotate, guide bearings 77 and 95 move up and down the slot of guide bearing surfaces 103 and 105 which are rotating with guide plates 35 and 37, rotating on lead bolts 7 and 45. Bush bearings 84 and 82 are engaged by the proper holes in cam rings 32 and 34 and minimize the friction between cam rings 32 and 34 and lead bolts 7 and 45. Pedal axle 19 rotates under spindle bearings 23 and 25 while spindle housing 12 and cam plates 31 and 33 remain stationary with respect to the other non-rotating elements of the pedal assembly.

In the second embodiment, guide bearings 77 and 95 and ball bushings 141 and 142 allow guide rod plugs 145 and 147 to rotate with respect to lead bolts 7 and 45 as lead bolts 7 and 45 and cam rings 32 and 34 rotate. Cam plate ball bushings 69 and 71 allow pedal axle 19 to rotate with respect to cam plates 31 and 33 and spindle ball bushing 165 enables pedal axle 19 to rotate with respect to spindle housing 12.

Therefore, in all the embodiments, cam plates 31 and 33, which control the elliptical motion of lead bolts 7 and 45, as described above, and thus, control the telescoping of pedals 5 and 41, are designed so that, at the start of the downward stroke of a pedal of a bicycle with this apparatus installed therein, the maximum leverage that can be attained thru the use of this apparatus is attained. This increases the length of the downward stroke of the pedal so that the rider can exert more force on the pedal per rotation, thus increasing the pedal assembly's efficiency. This increase in force per rotation means that a bicycle with this apparatus installed therein will require less energy to be expended by the rider to ride a fixed distance at a fixed speed than if the rider was riding a conventional bicycle that did not have this apparatus installed therein. Likewise, if a rider would exert equal energy on a bicycle with this apparatus installed therein and a conventional bicycle, the bicycle with this apparatus installed therein would go faster and farther than the conventional bicycle.

Once given the above disclosure, other features, modifications, and improvements will become apparent to one skilled in this art. Such features, modifications, and improvements are, therefore, considered to be a part of this invention, the scope of which is determined by the following claims:

I claim:

1. An apparatus for telescoping a pedal of a pedal assembly between a retracted and extended position during rotation of the pedal, said apparatus comprising a spindle housing having an axle shaft rotatably disposed therein, a first cam plate mounted on said axle shaft such that said first cam plate is stationary relative to said spindle housing, a first cam ring radially spaced from said first cam plate by a ring bearing disposed circumferentially therebetween, a pedal arm attached to said axle shaft, a pedal guide slidably mounted rectilinearly on said pedal arm and having a lead bolt means attached thereto, the pedal being attached to said pedal guide and a drive means interconnected to said axle shaft to rotate with said axle shaft, said lead bolt means being rotatably coupled to said first cam ring to interconnect said pedal guide to the periphery of said first cam ring such that said lead bolt means and said pedal guide rotate together with said first cam ring about said first cam plate, said lead bolt means being rotatably movable relative to said first cam ring wherein said first cam ring controls the movement of said lead bolt means to move said pedal guide between said retracted and extended position as said pedal arm and said pedal guide rotate with said axle shaft.

2. An apparatus as defined in claim 1 wherein said lead bolt means extends through an aperture formed in said first cam ring such that said lead bolt means freely rotates within said aperture.

3. An apparatus as defined in claim 1 further comprising a guide rod holder coupled to said lead bolt means, said guide rod holder extending radially outwardly from said pedal guide.

4. An apparatus as defined in claim 3 wherein said guide rod holder extends longitudinally inward toward said axle shaft from the inner portion of said pedal guide.

5. An apparatus as defined in claim 4 wherein said lead bolt means is substantially aligned with said axle shaft in the same plane perpendicular relative to the length of said pedal arm when said pedal guide is retracted.

6. An apparatus as defined in claim 1 wherein said apparatus further comprises a guide plate centrally located on said axle shaft having a radial slot therein to receive said lead bolt means.

7. An apparatus as defined in claim 6 wherein said apparatus further comprises a guide bearing, said guide bearing being located on said lead bolt means and interfacing with said radial slot of said guide plate.

8. An apparatus as defined in claim 7 wherein said apparatus further comprises a guide bearing surface located in said radial slot of said guide plate and interfacing with said guide bearing.

9. An apparatus as defined in claim 6 wherein said drive means, guide plate, and first cam plate are located between said pedal arm and the center of said spindle housing.

10. An apparatus as defined in claim 1 wherein the apparatus further comprises second cam ring and a second cam plate located on the opposite side of said spindle housing as said drive means, said first cam plate and said first cam ring.

11. An apparatus as defined in claim 1 wherein said apparatus further comprises a cam plate ball bushing located on said axle shaft between said axle shaft and said cam plate.

12. An apparatus as defined in claim 1 wherein said apparatus further comprises a chain guard attached to said spindle housing and said first cam plate, said chain guard radially covering an arc of said drive means.

13. An apparatus as defined in claim 1 wherein said first cam plate and said drive means have slots formed therein to minimize the weight of said apparatus.

14. An apparatus as defined in claim 1 wherein said pedal guide is cylindrical in shape, wherein said lead bolt means attaches to said pedal guide near one end of said pedal guide, and wherein said pedal attaches to said pedal guide at the end of said pedal guide opposite said lead bolt means.

15. An apparatus for telescoping a pedal of a pedal assembly between a retracted and extended position during rotation of the pedal, said apparatus comprising a spindle housing having an axle shaft rotatably disposed therein, a first cam plate mounted on said axle shaft such that said first cam plate is stationary relative to said spindle housing, a first cam ring radially spaced from said first cam plate by a ring bearing disposed circumferentially therebetween, a pedal arm attached to said axle shaft, a pedal guide slidably mounted rectilinearly on said pedal arm and having a lead bolt means attached thereto, the pedal being attached to said pedal guide and a drive means interconnected to said axle shaft to rotate with said axle shaft, said lead bolt means being rotatably coupled to said first cam ring to interconnect said pedal guide to said first cam ring by a guide rod holder extending radially outwardly from the longitudinal axis of said pedal guide and longitudinally inwardly toward said axle shaft such that said lead bolt and said pedal guide rotate together with said first cam ring around said first cam plate, said lead bolt means being rotatably movable relative to said first cam ring wherein said cam ring controls the movement of said lead bolt means to move said pedal guide between said retracted and extended position as said pedal arm and said pedal guide rotate with said axle shaft.

* * * * *